UNITED STATES PATENT OFFICE.

CARL THEODOR MICHAËLY, OF SURBURG, GERMANY.

MAKING FOOD FOR ANIMALS.

946,642.　　　　　Specification of Letters Patent.　　Patented Jan. 18, 1910.

No Drawing.　　Application filed October 15, 1906.　Serial No. 338,971.

*To all whom it may concern:*

Be it known that I, CARL THEODOR MICHAËLY, a subject of the German Emperor, and resident of Surburg, in Alsace-Lorraine, German Empire, landlord, have invented certain new and useful Improvements in Making Food for Animals, of which the following is an exact specification.

This invention relates to a new method for the production of food for animals, more especially for horses.

It is well known that molasses (a product that is obtained in the production of beet-root-sugar) is highly suitable for being used as food for animals in combination with the usual rough materials as chaff and the like in view of its preserving as well as its nutritive properties. Hitherto molasses food has been produced of very varied compositions. For obtaining an equal moistening of the rough materials with the molasses the latter has been used in such quantities that a mixture of such ingredients was unsuitable owing to its high amount of potash. If however the addition of molasses is considerably diminished then the proportions of molasses and the other food ingredients become unfavorable in that the former cannot be equally divided for moistening the mixture. Thereby the binding as well as the preserving properties of the molasses are lost. This defect is met by adding a quantity of water to the aforementioned mixture. The water admission is effected in a distinct manner, the grains, to be added to the mixture in relatively high percentage, as will be hereinafter fully described, being saturated with water in such manner that the grain takes up the maximum quantity of soaking water without appearing wet externally. The grain treated in such manner is then added to a mixture consisting of molasses, rough food and eventually other ingredients as malt residues and the like, without any previous grinding and then is pressed into suitable molds. By this compression the grain after soaking is crushed and aids the molasses of the mixture to penetrate the whole mixture and also the binding of the ingredients is promoted by the gluten and in case a hot soaking has taken place, by the pasted starch of the grain. In this way a food cake is obtained in which the pasting constituents cause the rough material to adhere to each other and which is similar to the usual food mixtures. Owing to the pressing there is the possibility of easy transportation and a convenient dividing of the rations. The compresison has the further advantage that all constituents belonging to a complete food ration can be combined in a single cake, whereas in the compressed food materials as hitherto used only distinct groups of ingredients could be compressed and to prepare the food for consumption various products must be mixed.

The important feature of the present invention consists in employing only a small proportion of molasses for preserving and binding the rough food and adding to this mixture a considerable quantity of previously soaked grain which supplies the additional binding substance necessary for holding the mixture in briquet form, then pressing the mixture of molasses, dry rough food and soaked grain.

I will now proceed to indicate by way of example only the proportions of the material for carrying into effect my invention. 36 per cent. of rough food preferably a mixture of chaff from hay and straw is intimately mixed with 22 per cent. of malt residues. To this mixture which may be previously heated, is added 8 per cent. of molasses which also can be previously heated, and all the ingredients are mechanically mixed. Then 34 per cent. of grain in a steeped condition such for instance as a mixture of oats, maize and rye, is added and after being intimately mixed the whole mixture is treated in a press. The food briquets produced in such manner have sufficient strength to be subjected to any kind of transport, for instance they can be wrapped in the form of rollers for military purposes, or they can be arranged on lace or cord when holes are provided in the cakes by the hydraulic pressing, so that food rations for many days can be transported without difficulties and in less compass. For facilitating the breaking in pieces of the cake, grooves can be pressed in the cake for providing thin spots therein.

Having thus fully described the nature of my invention, what I desire to secure by Letters Patent of the United States is:—

Process for the production of a durable food for animals, consisting in mixing about 36 parts of rough food material with about 22 parts of malt in the dry state, mixing therewith 8 parts of molasses, then mixing with 34 parts of grain which has been previously soaked in water, the whole being thereafter subjected to pressure for the purpose of pressing out superfluous liquid, substantially as described.

In witness whereof I have hereunto set my hand in the presence of two witnesses.

CARL THEODOR MICHAËLY.

Witnesses:
ERWIN KLAUSER,
H. W. HARRIS.